United States Patent Office 3,059,030
Patented Oct. 16, 1962

3,059,030
DIKETOCYCLOBUTENEDIOL AND ALKALI METAL SALTS THEREOF
Joseph D. Park and Sidney Cohen, Boulder, Colo., assignors to Minnesota Mining and Manufacturing Company, St. Paul, Minn., a corporation of Delaware
No Drawing. Filed June 15, 1959, Ser. No. 820,119
5 Claims. (Cl. 260—586)

This invention relates to certain derivatives of cyclobutene and more particularly to diketocyclobutenediol and the process for its preparation.

An object of the invention is to prepare diketocyclobutenediol and salts thereof. Another object is to provide a process for the preparation of these compounds. Other objects of the invention will be apparent from the following disclosures.

Diketocyclobutenediol is a strongly acidic substance which may be represented by the formula:

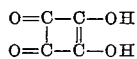

As will be seen from the formula, diketocyclobutenediol contains two hydroxyl groups which are available to yield hydrogen ions in aqueous systems. The $pK_1$ is about 1, and the $pK_2$ is 2.2.

Broadly speaking, diketocyclobutenediol can be prepared by the aqueous hydrolysis of halogenated polyethers of cyclobutene, such as, for example, 1,3,3-triethoxy-2-chloro-4,4-difluoro-cyclobutene or 1,2-diethoxy-3,3,4,4-tetrafluorocyclobutene-1. The hydrolysis takes place beginning with neutral or acid conditions, and the reaction mixture becomes progressively more acidic as the hydrolysis proceeds.

The intermediate halogenated ethers can be prepared by the methods disclosed in the reports of Park, Snow and Lacher, J. Am. Chem. Soc., v. 73, pp. 2342–5, 1951 and Park, Sharrah and Lacher, J. Am. Chem. Soc., v. 71, pp. 2337–9, 1949.

The following examples will more specifically describe the preparation and properties of the novel compound.

*Example 1*

A mixture of 80 g. (0.37 mole) of 1,2-diethoxy-3,3,4,4-tetrafluorocyclobutene-1, and 250 ml. of 50 percent aqueous sulfuric acid was heated for 12 hours at 100° C., with stirring. The originally liquid two-phase system became practically solid. The reaction mixture was filtered and the solid precipitate which was recovered, and which consisted substantially of diketocyclobutenediol, was dissolved in 800 ml. of boiling water. On cooling, the diketocyclobutenediol crystallized from solution. The crystals were removed by filtration, washed with acetone and dried. The yield was over 90 percent of theoretical.

Diketocyclobutenediol thus prepared is a white crystalline solid which decomposes on heating at about 300° C., as determined using a melting point block. The substance is very soluble in water, and the water solution is very strongly acidic. The aqueous solution produces an intense purple color with ferric chloride test solution. The compound also possesses strong reducing properties and decolorizes ceric nitrate solutions, permanganate solutions and bromine water. Diketocyclobutenediol also gives a very strong periodic acid test. The infrared spectrum shows a broad absorption band at about $4.3\mu$ and sharp peaks characteristic of carbonyls and C=C at $5.5\mu$ and $6.1\mu$, respectively.

Diketocyclobutenediol is useful for its acidic properties. It also has strong chelating properties and can be employed for sequestering metallic ions such as iron, zirconium, nickel, and the like.

With monovalent cations, such as sodium, potassium and cesium, diketocyclobutenediol forms salts which are water-soluble and can be recovered from their solutions by evaporation. Thus, by addition of sufficient amounts of sodium hydroxide, potassium hydroxide and cesium hydroxide to aqueous solutions of diketocyclobutenediol to neutralize the acidity of the solutions, and evaporation to dryness, there were formed, respectively, sodium, potassium, and cesium salts of diketocyclobutenediol. These were white, crystalline substances.

*Example 2*

A mixture of 18.53 g. (0.072 moles) of 1,3,3,-triethoxy-2-chloro-4,4-difluoro-cyclobutene and 50 ml. of distilled water was refluxed for about 5 hours. During refluxing, the initially two-phase system became homogeneous and the reflux temperature changed from 101° C. to 84° C. owing to the formation of ethanol upon hydrolysis. On cooling, solid diketocyclobutenediol crystallized from the strongly acidic aqueous reaction mixture. The solid material was removed by filtration and recrystallized from water. Diketocyclobutenediol thus prepared decomposed at about 293° C. and was identical in other properties with that produced in Example 1.

*Analysis.*—Calculated for $C_4H_2O_4$: C, 42.11; H, 1.78. Found: C, 42.21; H, 1.90.

What is claimed is:
1. A compound of the group consisting of diketocyclobutenediol and alkali metal salts thereof.
2. Diketocyclobutenediol.
3. The sodium salt of diketocyclobutenediol.
4. The potassium salt of diketocyclobutenediol.
5. The cesium salt of diketocyclobuteneediol.

References Cited in the file of this patent
UNITED STATES PATENTS 2,957,918    Smutny et al. _____ Oct. 25, 1960

OTHER REFERENCES

Angus et al.: Chemical Abstracts, volume 30, page 1740 (1936).